Feb. 6, 1934.  C. E. HILLERY-COLLINGS  1,946,310
MEANS FOR INTERMITTENTLY TRAVERSING PHOTOGRAPHIC FILMS AND
OBTAINING SYNCHRONIZED FILM AND SHUTTER MOVEMENTS
IN CINEMATOGRAPHIC CAMERAS AND PROJECTORS
Filed Feb. 25, 1932
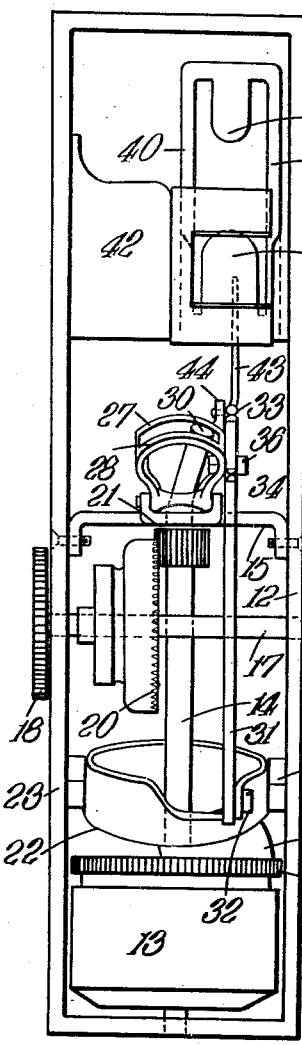
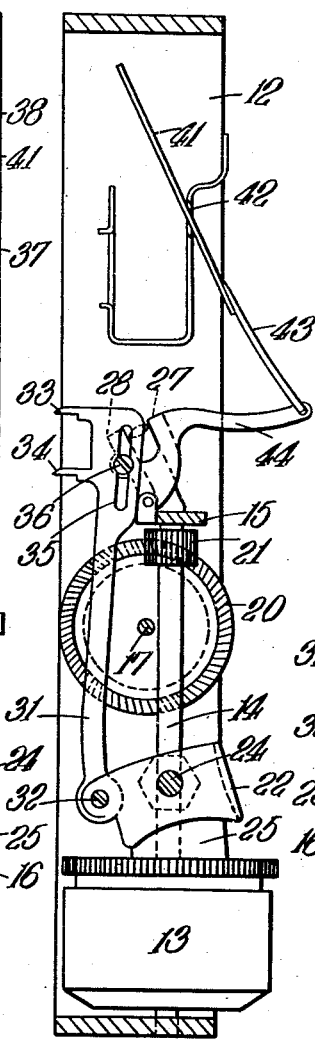
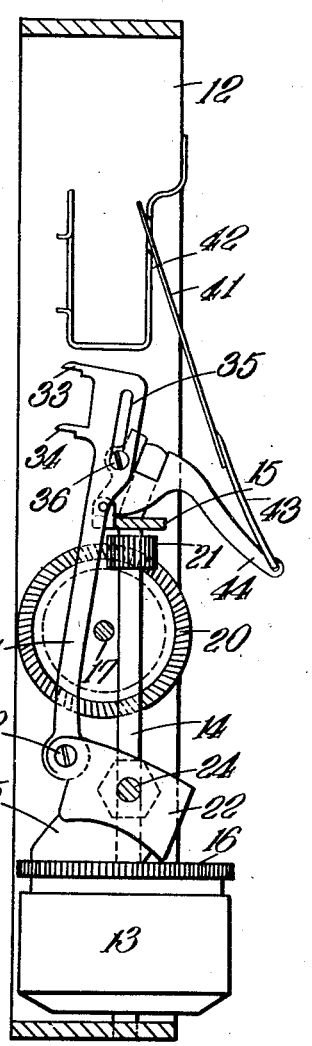
CHARLES EDWARD HILLERY-COLLINGS
INVENTOR
BY Haseltine, Lake & Co.,
ATTORNEYS

Patented Feb. 6, 1934

1,946,310

UNITED STATES PATENT OFFICE 1,946,310

MEANS FOR INTERMITTENTLY TRAVERSING PHOTOGRAPHIC FILMS AND OBTAINING SYNCHRONIZED FILM AND SHUTTER MOVEMENTS IN CINEMATOGRAPHIC CAMERAS AND PROJECTORS

Charles Edward Hillery-Collings, London, England, assignor, by mesne assignments, to Camera-Projectors Limited, London, England, a British company Application February 25, 1932, Serial No. 595,103, and in Great Britain March 16, 1931

7 Claims. (Cl. 88—18.4)

This invention relates to means for intermittently traversing photographic films and for obtaining synchronized film and shutter movements in cinematographic cameras and projectors, in which the films are usually provided with longitudinally spaced perforations for engagement by one or more moving claws; for example in a very narrow film the perforations may be on the centre line for engagement by a single or double moving claw which intermittently traverses the film, while in a wider film there may be two rows of perforations near the edges of the film for engagement by separate claws moving in unison. The necessary compound movement of the claws in a somewhat D shaped path to engage and feed the film, to withdraw therefrom, and to return to the first position of engagement, has been accomplished by a variety of devices involving the use of cranks, cams, or a combination of cranks and cams, usually with links or pin and slot connections to restrain or guide the claw arm or lever. In some cases the same crank which imparts reciprocating and oscillating movement to the claw arm also imparts through suitable connections reciprocating movement to the shutter.

According to the invention two frames are arranged to rock or oscillate on pivots, hinges, or trunnions, one of these frames giving to the claw arm which is pivoted thereto the reciprocatory rectilinear component of its movement, while the second frame, which has a pin and slot connection with the claw arm, gives the oscillatory component of its movement to the claw arm. The shutter is also pivotally connected with the second frame, by the oscillation of which it is reciprocated in suitable guides.

In order that the said invention may be clearly understood and readily carried into effect the same will now be more fully described with reference to the accompanying drawing which illustrates an example of the invention applied to a camera for use with a narrow film, and in which:—

Figure 1 represents in rear elevation mechanism exemplifying the invention in the position in which the shutter is at the top of its stroke and the double claw is beginning its downward or operative stroke.

Figure 2 is a side elevation of the mechanism in the same position.

Figure 3 is a side elevation of the mechanism in which the operative crank and cam are shown in the opposite positions to those in Figures 1 and 2, the shutter being at its lowest point and the double claw rising towards the position in which the upper frame throws it into engagement with the perforated film.

In the drawing 12 indicates a removable inner casing or gear box, in the lower part of which is mounted a fly wheel 13 from which projects a rod 14 passing through a crossbar 15 secured in the casing 12. The fly wheel 13 is provided with teeth 16 by means of which it can be driven from an electric motor (not shown) or other source of power. On a shaft 17 is a toothed pinion 18 adapted to be driven by suitable gearing from a handle (not shown), and on this shaft 17 is secured a crown wheel 20 in mesh with a toothed pinion 21 on the rod 14, alternative means for imparting rotary motion to the fly wheel 13 and rod 14 being thus available. A rocking frame 22 is carried in trunnions 23, 24 on the inner casing 12, and is adapted to be rocked by the rotation of a cam 25 on the fly wheel 13. Another rocking frame comprising front and rear loops or stirrups 27 and 28 is hinged to the crossbar 15, and the free end 30 of the rod 14 enters between the said loops and is cranked to give rocking movements to the upper frame. A claw arm 31 is pivoted at 32 to the lower rocking frame 22 and thus receives from the said frame the vertical component of its movement. The arm 31 comprises one or more claws, in this example two claws 33 and 34, to engage in consecutive central perforations in the film (not shown), and a slot 35 in which works a pin 36 on the rear member 28 of the upper rocking frame, so that the oscillations of the said member enforced by the crank 30 give to the claws 33, 34, the approximately horizontal components of its movement in which it engages and disengages the film. The shutter 37 and flicker shutter 38 are connected together by side members 40, 41 which work in a guide 42 on the inner casing 12, and to the lower part of the shutter 37 is secured a tail-piece 43 pivotally connected with a rigid arm 44 projecting from the member 27 of the upper rocking frame, whereby the rectilineal reciprocation of the shutter is effected in perfect synchronization with the movements of the film actuated by the claw.

What I claim and desire to secure by Letters Patent of the United States is:—

1. An instrument adapted for use as a cinematographic camera and projector, including the combination of a pivoted claw arm to effect the travel of a film, oscillating means adapted to vertically reciprocate said claw arm, a flywheel provided with gear teeth to receive a drive from an external power source, means rigid with said flywheel to directly operate said oscillating means, a vertical shaft axially disposed on said flywheel and provided with a crank at its free end, a pivoted frame having two members adapted to be alternately engaged by said crank to oscillate the pivoted frame and operative connections between said pivoted frame and said claw arm to alternately bring said claw arm into and out of engagement with said film.

2. An instrument according to claim 1, provided with a shutter, a shutter guide, and a lever arm disposed on the pivoted frame and pivotally connected with said shutter in order to reciprocate the latter in said guide.

3. An instrument adapted for use as a cinematographic camera and projector, including a fly wheel having a cam portion, means for rotating said fly wheel, a pivoted frame in contact with said cam portion and adapted to be directly rocked thereby upon rotation of the fly wheel, a shaft extending axially from said fly wheel and having a crank upon the free end thereof, a second pivoted frame engaging the crank and adapted to be rocked thereby, a claw arm adapted to engage a strip of film and produce travel thereof, which claw arm is pivoted upon said first mentioned frame so as to receive the longitudinal reciprocatory component of its movement from said frame and is further connected by means of a pin and slot connection with said second frame so as to receive the transverse component of its movement from said last frame.

4. An instrument adapted for use as a cinematographic camera and projector, including the combination of a pivoted claw arm to effect the travel of a film, oscillating means adapted to vertically reciprocate said claw arm, a flywheel provided with means rigid therewith to directly operate said oscillating means, gear means disposed on said flywheel intermediate the main body portion thereof and said cam for receiving the drive from an external power source, a vertical shaft axially disposed on said flywheel and provided with a crank at its free end, a pivoted frame having two members adapted to be alternately engaged by said crank to oscillate the pivoted frame, and operative connections between said pivoted frame and said claw arm to alternately bring said claw arm into and out of engagement with said film.

5. An instrument adapted for use as a cinematographic camera and projector, including the combination of a pivoted claw arm to effect the travel of a film, a rocking frame oscillating about a horizontal axis and connected adjacent one edge to said claw arm for vertically reciprocating the latter, a flywheel provided with a cam rigid therewith for directly oscillating said rocking frame, there being gear means upon said flywheel for receiving a drive from an external power source, a vertical shaft axially disposed on said flywheel, extending freely upward past said oscillating frame and terminating in an integral crank, a pivoted frame having two members adapted to be alternately engaged by said crank to oscillate the pivoted frame, and operative connections between said pivoted frame and said claw arm to alternately bring said claw arm into and out of engagement with said film.

6. An instrument according to claim 1, wherein the crank forming the termination of the vertical flywheel shaft consists of a slightly bent portion making an angle much greater than 90° and less than 180° with the remainder of the shaft, while the pivoted frame having the two members alternately engaged by said crank is integral with said two members, and said latter members presenting a slot between them in which said crank is adapted to oscillate, which members and associated slot normally assume inclined positions with respect to the vertical in extreme operated positions of said pivoted frame.

7. An instrument adapted for use as a cinematographic camera and projector, including a fly wheel having a cam portion, means for rotating said fly wheel, a pivoted frame in contact with said cam portion and adapted to be directly rocked thereby upon rotation of the fly wheel, a shaft extending axially from said fly wheel and having a crank upon the free end thereof, a second pivoted frame engaging the crank and adapted to be rocked thereby, a claw arm adapted to engage a strip of film and produce travel thereof, which claw arm is pivoted upon said first mentioned frame so as to receive the longitudinal reciprocatory component of its movement from said frame and is itself connected with said second frame so as to receive the transverse component of its movement from said last frame.

CHARLES EDWARD HILLERY-COLLINGS.